United States Patent
Jacobs et al.

(10) Patent No.: US 12,467,808 B2
(45) Date of Patent: Nov. 11, 2025

(54) BRAKE PEDAL WITH FORCE SENSOR AND MEMBRANES

(71) Applicant: Sensata Technologies, Inc., Attleboro, MA (US)

(72) Inventors: Frank H. Jacobs, Broekland (NL); Laurens C. Fortgens, Odijk (NL); Jan-Willem Sloetjes, Wierden (NL)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 18/838,539

(22) PCT Filed: Mar. 17, 2023

(86) PCT No.: PCT/US2023/015556
§ 371 (c)(1),
(2) Date: Aug. 14, 2024

(87) PCT Pub. No.: WO2023/177900
PCT Pub. Date: Sep. 21, 2023

(65) Prior Publication Data
US 2025/0237564 A1 Jul. 24, 2025

Related U.S. Application Data
(60) Provisional application No. 63/321,058, filed on Mar. 17, 2022.

(51) Int. Cl.
*G01L 5/22* (2006.01)
*B60T 7/04* (2006.01)
(Continued)

(52) U.S. Cl.
CPC ............ *G01L 5/225* (2013.01); *B60T 7/042* (2013.01); *G01L 1/22* (2013.01); *G05G 1/38* (2013.01); *G05G 1/42* (2013.01)

(58) Field of Classification Search
CPC .......... G01L 5/225; G01L 1/22; B60T 7/042; G05G 1/38; G05G 1/42
See application file for complete search history.

(56) References Cited

U.S. PATENT DOCUMENTS

| | | | |
|---|---|---|---|
| 9,746,390 B2 * | 8/2017 | Schoot Uiterkamp | G01L 9/0051 |
| 11,892,866 B2 * | 2/2024 | Vanek | G01D 5/14 |

(Continued)

FOREIGN PATENT DOCUMENTS

| | | | |
|---|---|---|---|
| DE | 102008024852 A1 | 11/2009 | |
| GB | 850711 A * | 10/1960 | B60T 7/04 |
| WO | WO2021155046 A1 | 8/2021 | |

OTHER PUBLICATIONS

Fleming, et al., "New Automotive Sensors—A Review," IEEE Sensors Journal., vol. 8, No. 11, Nov. 2008, 22 pages.
(Continued)

*Primary Examiner* — Thomas C Diaz
(74) *Attorney, Agent, or Firm* — Lee & Hayes, P.C.

(57) ABSTRACT

A pedal system includes a user interface, e.g., a pedal for contacting by a driver of a vehicle, a force sensor, and a force transfer member between the user interface and the force sensor. A force applied to the user interface is detected and measured by the force sensor. One or more membranes, e.g., two membranes, are arranged at an outer surface of the force transfer member to decouple off-center loading and non-uniform forces, e.g., resulting from off-center force application at the user interface.

15 Claims, 16 Drawing Sheets

(51) Int. Cl.
　　　*G01L 1/22*　　　(2006.01)
　　　*G05G 1/38*　　　(2008.04)
　　　*G05G 1/42*　　　(2008.04)

(56) References Cited

U.S. PATENT DOCUMENTS

| | | | |
|---|---|---|---|
| 11,892,867 B2* | 2/2024 | Vanek | G05G 5/05 |
| 2006/0042393 A1* | 3/2006 | Kaneko | G01L 19/148 |
| | | | 73/753 |
| 2008/0202225 A1 | 8/2008 | Munz et al. | |
| 2011/0290030 A1* | 12/2011 | Willner | G01L 19/0627 |
| | | | 73/720 |
| 2012/0137786 A1 | 6/2012 | Staiger et al. | |
| 2012/0152037 A1 | 6/2012 | Wade | |
| 2012/0227477 A1 | 9/2012 | Borgers et al. | |
| 2013/0014595 A1 | 1/2013 | Huizinga et al. | |
| 2013/0192379 A1* | 8/2013 | Petrarca | G01L 9/00 |
| | | | 73/754 |
| 2014/0306513 A1 | 10/2014 | Cunningham et al. | |
| 2016/0252418 A1 | 9/2016 | Schoot Uiterkamp et al. | |
| 2020/0232862 A1 | 7/2020 | Baumgartner et al. | |
| 2021/0223120 A1 | 7/2021 | Fortgens et al. | |
| 2023/0259152 A1* | 8/2023 | Luu | G01D 5/14 |
| | | | 74/560 |
| 2024/0253601 A1* | 8/2024 | Kapocs | B60T 7/042 |

OTHER PUBLICATIONS

PCT Search Report and Written Opinion mailed Aug. 15, 2023 for PCT Application No. PCT/US23/15556, 12 pgs.

\* cited by examiner

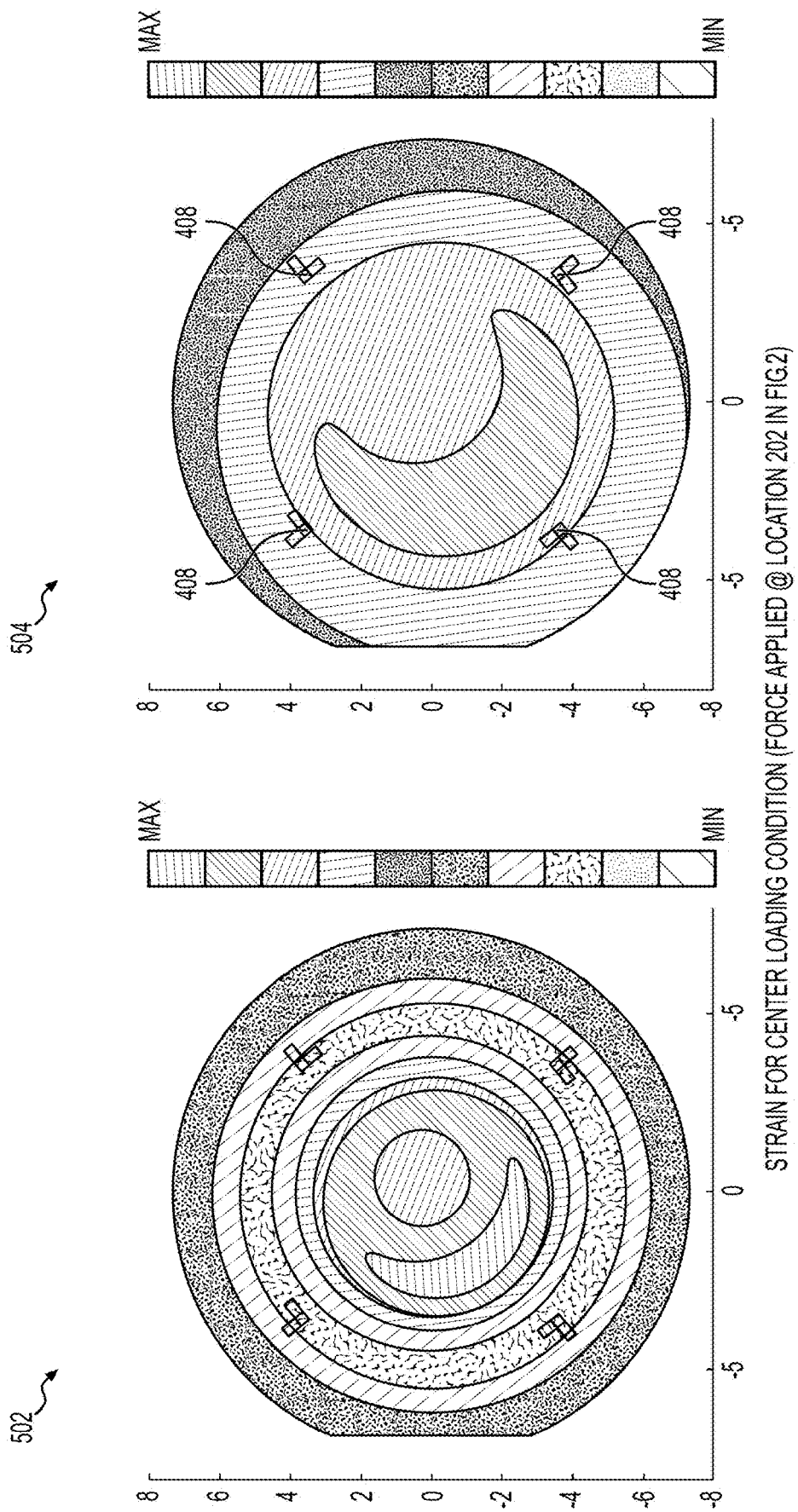

FIG. 6  DISPLACEMENT PLT CORRESPONDING TO OFF-CENTER LOADING CONDITION (FORCE APPLIED @ LOCATION 204 IN FIG.2)

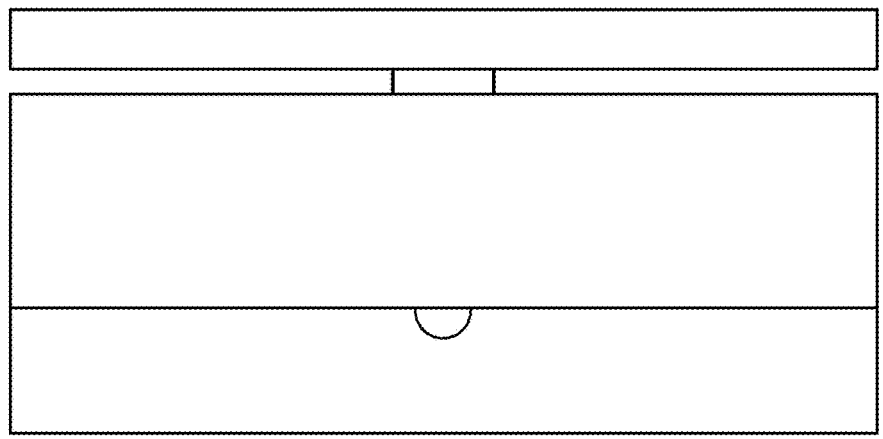
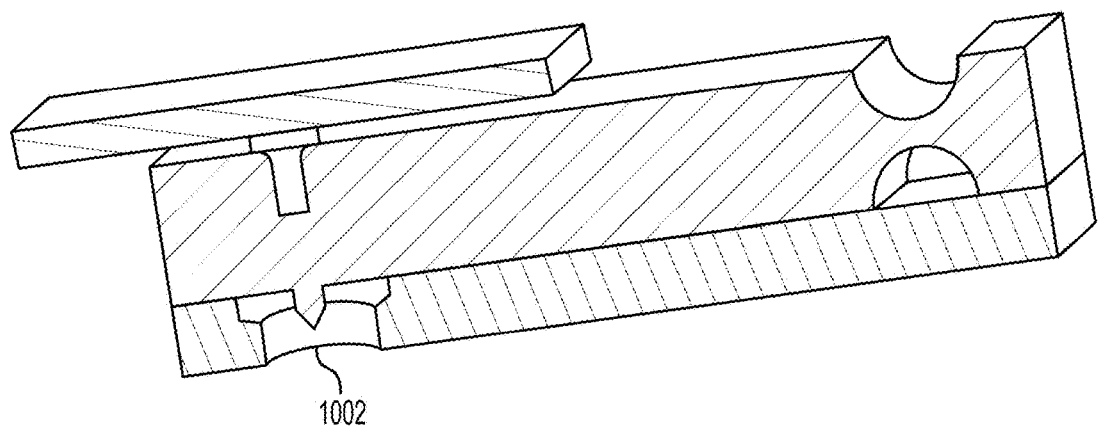
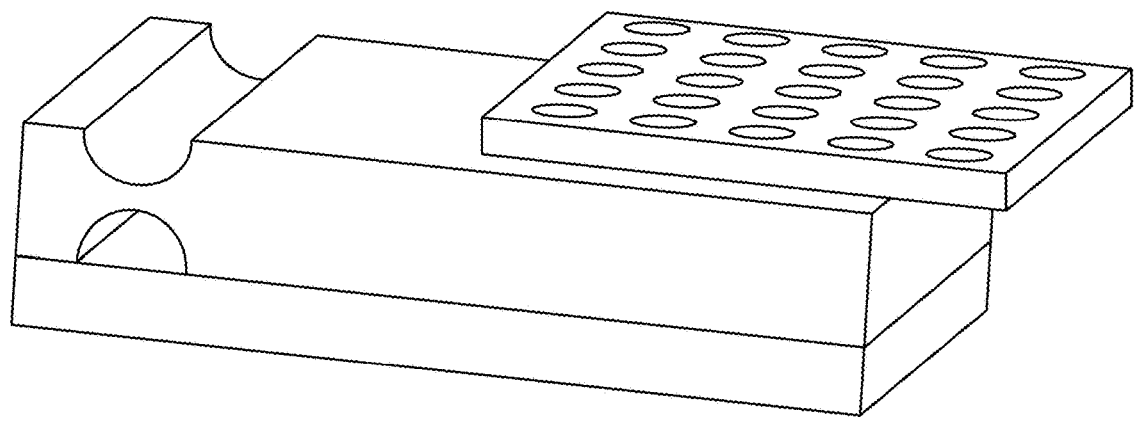
FIG. 10

BRAKE PEDAL WITH FORCE SENSOR AND MEMBRANES

CROSS-REFERENCE TO RELATED APPLICATION

This application claims the benefit of priority of International Application No. PCT/US2023/015556, filed Mar. 17, 2023, titled "BRAKE PEDAL WITH FORCE SENSOR AND MEMBRANES," which claims benefit of priority of U.S. Provisional Patent Application No. 63/321,058, filed Mar. 17, 2022, titled "Brake Pedal with Force Sensor and Membranes," the entire disclosure of each of which is hereby incorporated by reference.

FIELD OF THE TECHNOLOGY

The subject disclosure relates to force sensors, and more particularly to force sensors including micro-fuse strain gauges, including for use in brake pedal applications.

BACKGROUND OF TECHNOLOGY

Micro-fused strain gauge (MSG) technology is conventionally used in pressure sensors. The function of the pressure sensor is to transform the physical "fluid pressure" into a ratio-metric output voltage corresponding to the applied pressure. The same MSG technology can also be used to measure forces. For example, an applied force will result in a strain field change on the sensing element of the sensor. Using strain gauges, this strain field change can be measured and will be transformed into a ratio-metric output voltage.

Since pressure is a scalar, the load on the sensor element is typically ideally distributed. However, for force, which is a vector quantity, the measurement may be less straight forward. The measurement may also be more susceptible to parasitic forces such as side-loading or application of forces to non-concentric supporting areas. For example, off-center loads can lead to the load at the sensor being non-uniform, resulting in a shift of the strain field position on the sensing element, ultimately affecting the accuracy of the force sensor. These loads can also increase the stresses/strains in the silicon glass used to bond the gauges.

Accordingly, there is a need in the art for an improved pressure sensor that reliability quantifies applied axial load forces, even when those forces are off-center or off-axis. Moreover, there is a need in the art for an improved sensor design that can withstand such forces.

SUMMARY OF THE TECHNOLOGY

The subject technology relates to improved sensing systems and methods of using such systems. For example, aspects of this disclosure relate to improved force sensors that more reliability measure applied forces, including in brake pedal applications.

BRIEF DESCRIPTION OF THE DRAWINGS

So that those having ordinary skill in the art to which the disclosed systems and techniques pertain will more readily understand how to make and use the same, reference may be had to the following drawings.

FIG. 10 includes views of an alternative pedal design using force sensors, in accordance with aspects of this disclosure.

DETAILED DESCRIPTION

Figure 1A:
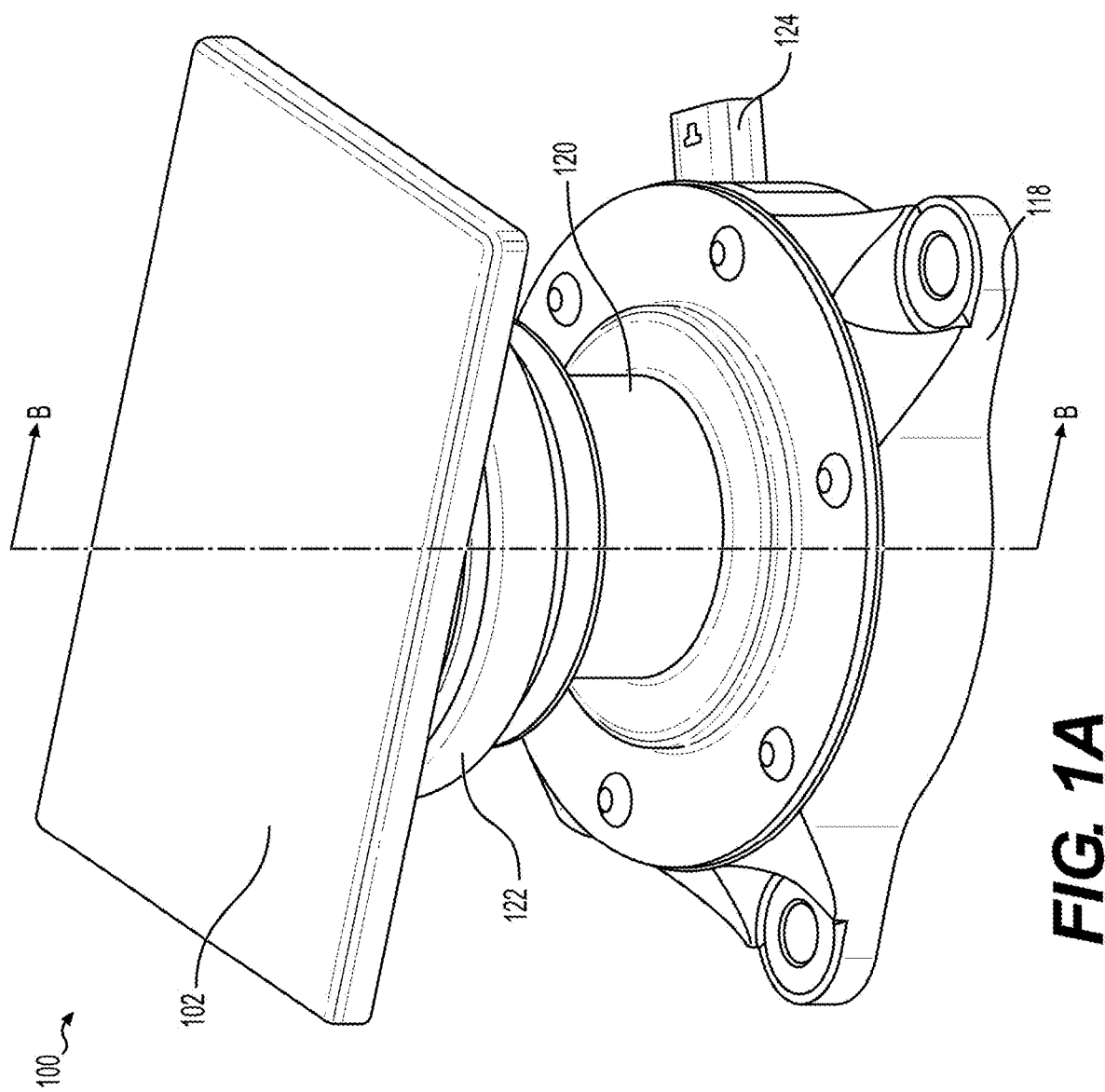
FIG. 1A is a perspective view of aspects of a (brake) pedal system, in accordance with aspects of this disclosure.

The subject technology overcomes many of the prior art problems associated with force sensors. In brief summary, the subject technology provides an improved force sensor design and techniques for using the force sensor design that result in improved detection of applied forces.

One application of force sensors like those described herein is for measuring force applied to a brake pedal in a vehicle. To understand the driver intent for braking, some conventional brake systems use a position sensor and a pressure sensor. However, a force sensor, such as detailed herein, may deliver a faster response and in some instances may provide a better correlation to the driver (braking) intent. The difference between normal load (force for normal operation) and proof load (overload force which should not affect the functionality of the sensor in the normal operating range) is one of the primary design drivers and concerns. For "typical" MSG pressure applications, the proof pressure is about 50% higher than the normal full-scale load. However, when used in a brake pedal applications, up to a 500% larger proof force may be desired, as compared to the normal operating forces. However, for forces that are up to 5 times the operating force (or more), it becomes a significant challenge to avoid damage to the sensing element. For instance, if the strains are too large, the glass (which will fix the gauge to the port) will break. This factor, in combination with off-center/side loading, may increase the risk of glass cracking. In addition, off-center/side loading will have an impact on the sensor accuracy. For pressure sensors, the radial strain at a certain radius may be constant. For force sensors, however, substantially-uniform axial loading is needed to have a constant strain at a defined radius. A constant strain at a defined radius (axial symmetric strain field) will result in each gauge at that defined radius experiencing the same strain field. This will give the same output for each gauge, resulting in an acceptable accuracy level.

In some examples, systems and techniques described herein can be embodied as a pedal, such as a zero-displacement pedal. In examples, the systems described herein can include a user interface, such as a pedal, with which a user, e.g., a driver, interfaces. For example, the user interface may be positioned for a user to press their foot while driving, e.g., as a brake pedal in a conventional vehicle. In examples, the user interface may include a substantially planar surface.

The systems and techniques described herein can also include a force transfer rod or similar force transfer member coupled to the pedal. For example, the force transfer member can include an elongate member, such as a rod, coupled at one end to the pedal. The force transfer member can include a hollow rod in some examples. In some instances, the pedal may be fixed relative to the force transfer member.

In examples of this disclosure, the force transfer member is coupled to one or more force sensors. For example when the force transfer member is an elongate member, like a rod, a first end of the force transfer member may be coupled to the pedal, as noted above, and a second end of the force transfer member may be coupled to the force sensor(s). The force sensor(s) can include one or more ring force sensors, pedal force sensors, and/or other force sensors. For example, the force sensors may include MSG technology, described herein.

Also in examples of this disclosure, a pedal system can include one or more membranes disposed to circumscribe the force transfer member. For example, two membranes may be axially spaced along the force transfer member, e.g., with a first membrane proximate a first end of the force transfer member (e.g., proximate the user interface) and a second membrane proximate a second end of the force transfer member (e.g., proximate the force sensor). In examples, the membranes may be relatively thin, annular membranes that contact an outer surface of the force transfer member. In examples, the membranes can have a substantially U-shaped cross-section, e.g., with an annular portion extending between an inner, upturned edge and an outer, upturned edge. The inner edge may be configured to contact an outer surface of the force transfer member.

A pedal system according to this disclosure can also include a housing. For example, the housing may be a sleeve-like member disposed around the force transfer member. The housing can act as a barrier to dirt, debris, and/or other contaminants. The housing can also act as a support for the membrane(s). For example, the housing can include one or more features configured to retain and/or position the membrane(s) relative to the force transfer member. Without limitation, the housing can include a contour configured to cooperate with the outer edge(s) of the membrane(s) to retain or otherwise support the membrane(s).

In examples of this disclosure, in operation, a force applied to the user interface is transferred by the force transfer member for detection at the force sensor(s). When the applied force is generally along an axis of the force transfer member, a consistent force will be determined at the sensor. In some examples, the applied force may be other than along the axis of the force transfer member. For instance, in at least some examples, the user interface may have a footprint (e.g., in a plane normal to the axis of the force transfer member) larger than a footprint of the force transfer member. Forces applied proximate edges of the user interface will result in sideloading, e.g., bending about the force transfer member and/or asymmetrical loading relative to the axis. In aspects of this disclosure, the membrane(s) will offset or otherwise dampen the sideloading, resulting in improved force detection.

Without limitation, the systems and techniques described herein can provide improved sensors and sensing systems for use in automotive applications, including braking applications. However, this disclosure is not limited to use in such applications; the systems and techniques described herein may be useful with any force sensor applications that can benefit from improvements in force detection.

Aspects of this disclosure may also enable zero-displacement brake pedals. For instance, as noted above, some conventional systems may use position sensors to determine displacement. However, in the absence of displacement, there is no use for position sensors. Force sensors may be used instead. When using force sensors, however, to achieve accurate vehicle control it may be important that the strain field at the sensor membrane is centered. This should even be the case if the driver places his foot at the edge of the pedal, e.g., instead of the center. Stated differently, regardless of the driver foot's position on the brake pedal, the sensor should determine the correct applied force. Aspects of this disclosure facilitate this consistent, correct force determination by implementing a double membrane concept. This will be explained in more detail with some simulation results and integration examples.

Figure 1B:
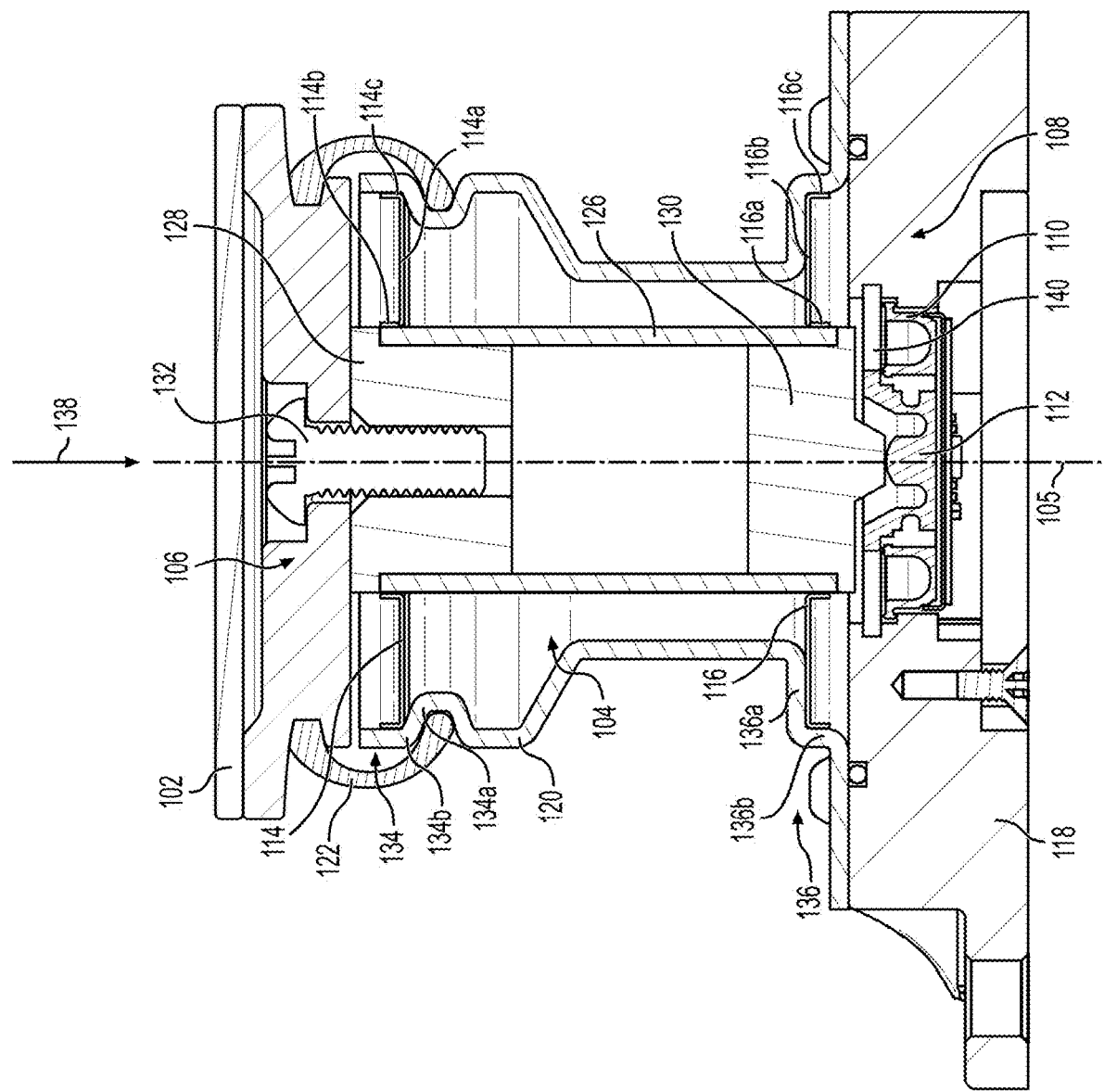
FIG. 1B is a partial cross-sectional, perspective view of a portion of a (brake) pedal assembly of the (brake) pedal system of FIG. 1A, taken along taken along section line B-B in FIG. 1A, in accordance with aspects of this disclosure.

FIG. 1A is a perspective view of a brake pedal system 100 according to aspects of this disclosure. FIG. 1B is a cross-sectional view of the system 100, taken along the section line B-B in FIG. 1A. As illustrated, the system 100 includes a brake pedal 102 or user interface. In the example, the brake pedal 102 is comprised of a substantially planar member, e.g., embodied as a plate, configured for contacting by a driver, e.g., a foot of the driver. The brake pedal 102 is coupled to a force transfer member 104, which, as detailed further below, may include a central column or rod (best shown in FIG. 1B). More specifically, the force transfer member 104 extends from a first end 106 (the upper end in FIG. 1B) to a second end 108 (the lower end in FIG. 1B). The brake pedal system 100 also includes one or more force sensors disposed proximate the second end 108 of the force transfer member 104. In the example of FIG. 1, the one or more force sensors include a ring force sensor 110, e.g., as a first force sensor, and a pedal force sensor 112, e.g., as a second force sensor. Although two force sensors are shown in FIG. 1, more or fewer force sensors may be provided. For example, and without limitation, a single force sensor, which may be the ring force sensor 110 or the pedal force sensor 112 may be used.

The force sensors 110, 112 are disposed to sense a force applied to the brake pedal 102 (and transmitted through the force transfer member 104). For example, the brake pedal 102 is coupled or fixed to the first end 106 of the force transfer member 104 and the force sensor is coupled (or fixed) to the second end 108 of the force transfer member 104. In examples, the brake pedal 102 and the force transfer member 104 may be rigid members and/or rigidly secured, e.g., such that an application of force to the brake pedal 102, as described further herein, results in no or negligible movement (e.g., movements on the order of microns) of the brake pedal 102 and/or the force transfer member 104, e.g., relative to the force sensors 110, 112. For instance, the brake pedal system 100 may be a zero-displacement pedal system, e.g., free from positional changes and thus not requiring position sensors, or the like.

As best illustrated in FIG. 1B, the brake pedal system 100 also includes a first membrane 114 and a second membrane 116. The membranes 114, 116 are substantially ring-shaped, configured to circumscribe an outer surface of the force transfer member 104. The first membrane 114 and the second membrane 116 are positioned axially along the force transfer member 104, e.g., with the first membrane 114 relatively closer to the first end 106 of the force transfer member 104 and with the second membrane 116 relatively closer to the second end 108 of the force transfer member 104. In the illustrated example, the membranes 114, 116 have a substantially U-shaped cross-section. Specifically, the membranes 114, 116 are illustrated as including annular portions 114a, 116a extending between respective inner edges 114b, 116b and outer edges 114c, 116c. The inner edges 114b, 116b and the outer edges 114c, 116c extend from the annular portions 114a, 116a substantially at right angles, although other angles may be used. The membranes 114, 116 may be thin membranes, e.g. from about 0.1 mm to about 0.5 mm. In examples, the membranes 114, 116 may be about 0.3 mm thick. Other, e.g., thicker, thicknesses also may be used.

Although two membranes 114, 116 are shown in FIG. 1B, more or fewer (e.g., a single membrane) may be provided along the axial length of the force transfer member 104. Other cross-sections also may be used. For instance, and without limitation, cross-sections that include only the inner edges 114b, 116b, only the outer edges 114c, 116c, and/or neither the inner edges 114b, 116b nor the outer edges 114c, 116c, also are contemplated. As detailed further herein, the membranes 114, 116 may be configured to resist canting or other movement other than along the axis 105, and any cross-section that facilitates this functionality may be used.

As also illustrated in FIGS. 1A and 1B, the brake pedal system 100 also includes a base 118, e.g., via which the system 100 is mounted. As illustrated in FIG. 1B, the ring force sensor 110 and/or the pedal force sensor 112 may be coupled to the base 118.

The system 100 also includes a housing 120. The housing 120 generally surrounds the force transfer member 104 and includes features, e.g., contoured walls, for retaining the first membrane 114 and the second membrane 116 proximate the respective ends 106, 108 of the force transfer member 104. The system 100 is also illustrated as including a baffle 122, e.g., to prevent dirt and debris from entering the housing 120. As also shown, the system 100 includes a connector 124, which may facilitate connection, e.g., electrical connection, data transmission connection, and/or the like, of the system 100 to one or more external systems.

As noted above, the force transfer member 104 is configured to transmit a force applied at the pedal 102 to the force sensor(s) 110, 112. As shown in more detail in FIG. 1B, in the illustrated example the force transfer member 104 includes an elongate rod 126, a first endcap 128 coupled to a first end of the elongate rod 126 (e.g., at the first end 106 of the force transfer member 104), and a second endcap 130 at a second end of the elongate rod 126 (e.g., at the second end 108 of the force transfer member 104). The elongate rod 126 is hollow, with a substantially cylindrical sidewall. The pedal 102, e.g., as the user interface, is fixed to the first endcap 128, e.g., via a threaded fastener 132. Of course, other coupling mechanisms may also be used.

The membranes 114, 116 are configured to contact the outer surface of the elongate rod 126. Specifically, the inner edges 114b, 116b of the membranes 114, 116 may be radially-inward legs of the membranes 114, 116 and may be configured to contact an outer surface of the force transfer member 104. In the illustrated example, the inner edge 114b of the first membrane 114 extends from the annular portion 114a in a direction toward the pedal 102 (e.g., upward in the orientation of FIG. 1B). In contrast, the inner edge 116b of the second membrane 116 extends from the annular portion 116a in a direction away from the pedal 102 (e.g., downward in the orientation of FIG. 1B). This arrangement is for example only. Without limitation, the orientation of either of the membranes 114, 116 may be reversed, e.g., such that the inner edge 114b (and the outer edge 114c) extend from the annular portion 114a in a direction away from the pedal 102 and/or such that the inner edge 116b (and the outer edge 116c) extend from the annular portion 116a in a direction toward the pedal 102.

As also illustrated, the membranes 114, 116 are retained, at least in part, by the housing 120. Specifically, in the illustrated example, the housing 120 comprises a hollow sleeve with a contoured sidewall. For example, proximate a first end (e.g., the top in FIG. 1B), the sleeve 120 includes a first membrane retention portion 134 configured to retain the first membrane 114. For example, the first membrane retention portion 134 includes a flanged surface 134a, e.g. generally perpendicular to the axis 105, and an outer surface 134b extending from the flanged surface 134a. The flanged surface 134a and the outer surface 134b form an L-shaped cross-section, generally configured to cooperate with a portion of the annular portion 114a of the first membrane 114 and the outer edge 114c of the first membrane 114. That is, the first membrane retention portion 134 may be complementary in shape and/or size to the first membrane 114, to retain the first membrane 114 in a desired position and/or orientation. As will be appreciated, the first membrane retention portion 134 is shown for example only. Different shapes and/or configurations may be used to retain the first membrane. Without limitation, when the first membrane 114 has a profile different from the one shown, the first membrane retention portion 134 may be differently constructed.

Proximate a second end opposite the first end (e.g., proximate the bottom in the FIG. 1B), the sleeve 120 includes a second membrane retention portion 136 configured to retain the second membrane 116. For example, the second membrane retention portion 136 includes a flanged surface 136a, e.g., generally perpendicular to the axis 105, and an outer surface 136b extending from the flanged surface 136a. The flanged surface 136a and the outer surface 136b form an L-shaped cross-section, generally configured to cooperate with a portion of the annular portion 116a of the second membrane 116 and the outer edge 116c of the second membrane 116. That is, the second membrane retention portion 136 may be complementary in shape and/or size to the second membrane 116, to retain the second membrane 116 in a desired position and/or orientation. As will be appreciated, the second membrane retention portion 136 is shown for example only. Different shapes and/or configurations may be used to retain the second membrane 116. Without limitation, when the second membrane 116 has a profile different from the one shown, the second membrane retention portion 136 may be differently constructed.

In operation, a force applied to the brake pedal 102, e.g., generally in the direction represented by the arrow 138, will be transmitted through the force transfer member 104 and to the ring force sensor 110 and/or the pedal force sensor 112. More specifically, as illustrated in FIG. 1B, the endcap 130 is in contact with the pedal force sensor 112. Moreover, a ring 140 is disposed proximate the endcap 130, in contact with the ring force sensor 110. In some examples, the ring 140 may be part of, e.g., integrated into, the ring force sensor 110. The pedal force sensor 112 and/or the ring force sensor 110 is a force sensor including micro-fused strain gauge technology, as described herein. For example, the sensor(s) 110, 112 can include a plurality of silicon glass micro-fused strain gauges configured to detect a force applied at the pedal 102. Specifically, the force applied at the pedal 102 will be transferred, via the force transfer member 104, and sensed based on a resulting strain field change at the sensing element. A signal associated with the change is generated at the sensor(s) 110, 112, and transmitted, e.g., via a cable connected at the connector 124.

As illustrated in FIGS. 1A and 1B, the brake pedal 102 may have a larger footprint than the force transfer member 104. That is, the length and/or width of the pedal 102 comprising the user interface (e.g., where the driver contacts the pedal 102 during use) may be greater than a diameter of the rod 126. Accordingly, should a user interface with the brake pedal 102 at locations outside the footprint of the rod 126, e.g., at a position proximate an edge of the pedal, the pedal 102 and the force transfer member 104 may experience sideloading, e.g., oblique forces other than along the axis 105. Sideloading may result in inaccurate measurement at the sensors and/or damage to the sensors, including but not limited to cracking, as discussed above. In examples of this disclosure, the membranes 114, 116 function to mitigate the effects of off-center loading. For example, the membranes may function to de-couple or absorb the off-center loads resulting from forces applied to the pedal 102 at distances from the axis 105. In examples, the membranes 114, 116 have a stiffness, e.g., in the axial direction, that is lower (significantly lower in some examples) than a stiffness of the membrane associated with the force sensor(s). Specifically, the stiffness in the axial direction should be selected to not reduce or absorb the axial component of the force applied to the brake pedal. However, the membranes 114, 116 are relatively rigid in the radial and circumferential dimensions, to resistive sideloading, as discussed above.

Figure 2:
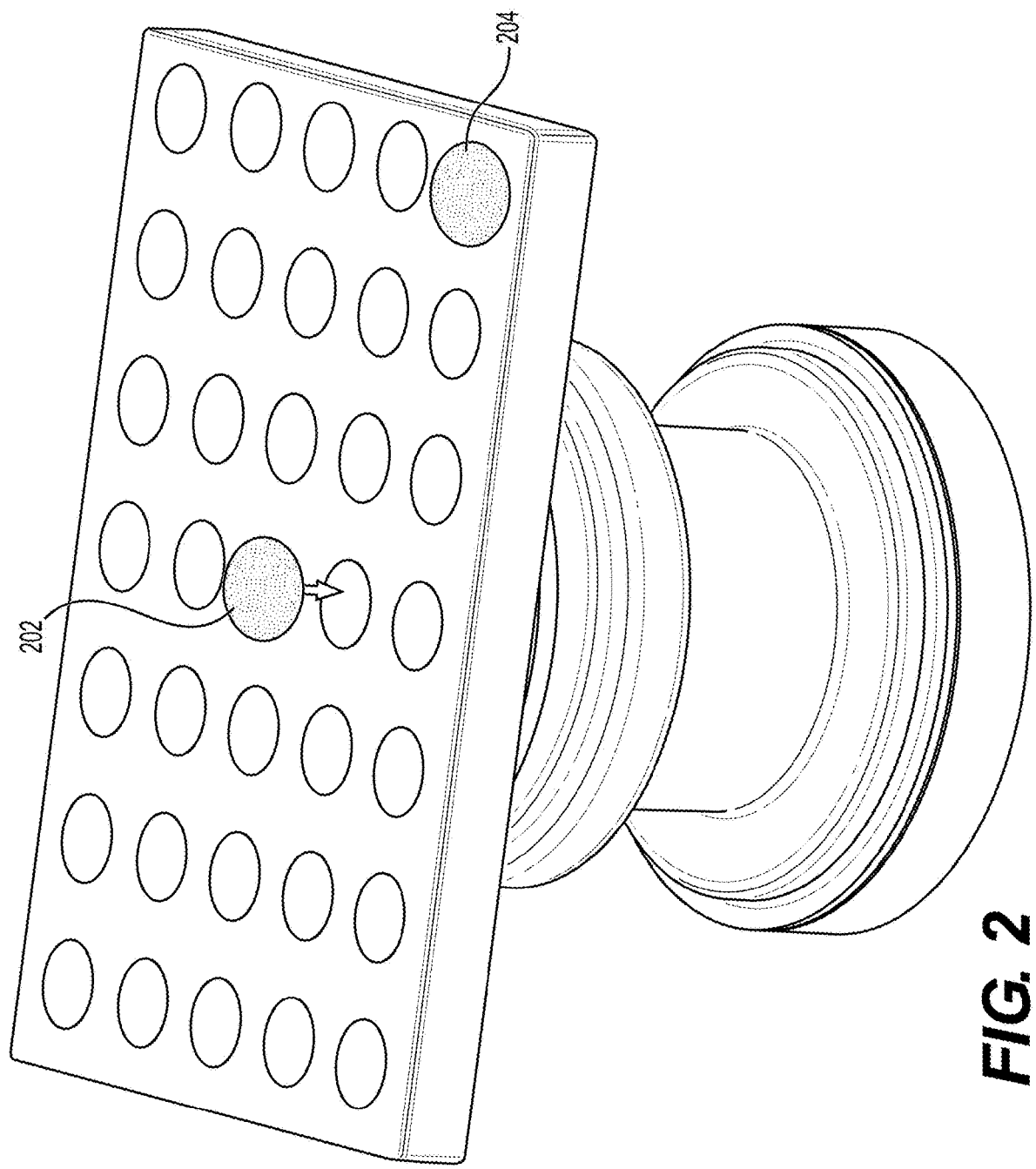
FIG. 2 is a perspective view of the pedal assembly of FIG. 1A, showing loading conditions, in accordance with aspects of this disclosure.

FIGS. 2-5 show aspects of the brake pedal system 100 under certain load conditions. More specifically, FIG. 2 is a perspective view of the brake pedal system 100, showing two locations 202, 204 on the brake pedal 102 at which a 600 N force is applied under testing scenarios detailed below. The first location 202 is a central location, e.g., generally along the axis 105, to the brake pedal 102. The second location 204 is an off-center location, e.g., proximate an edge of the brake pedal 102.

Figure 3:
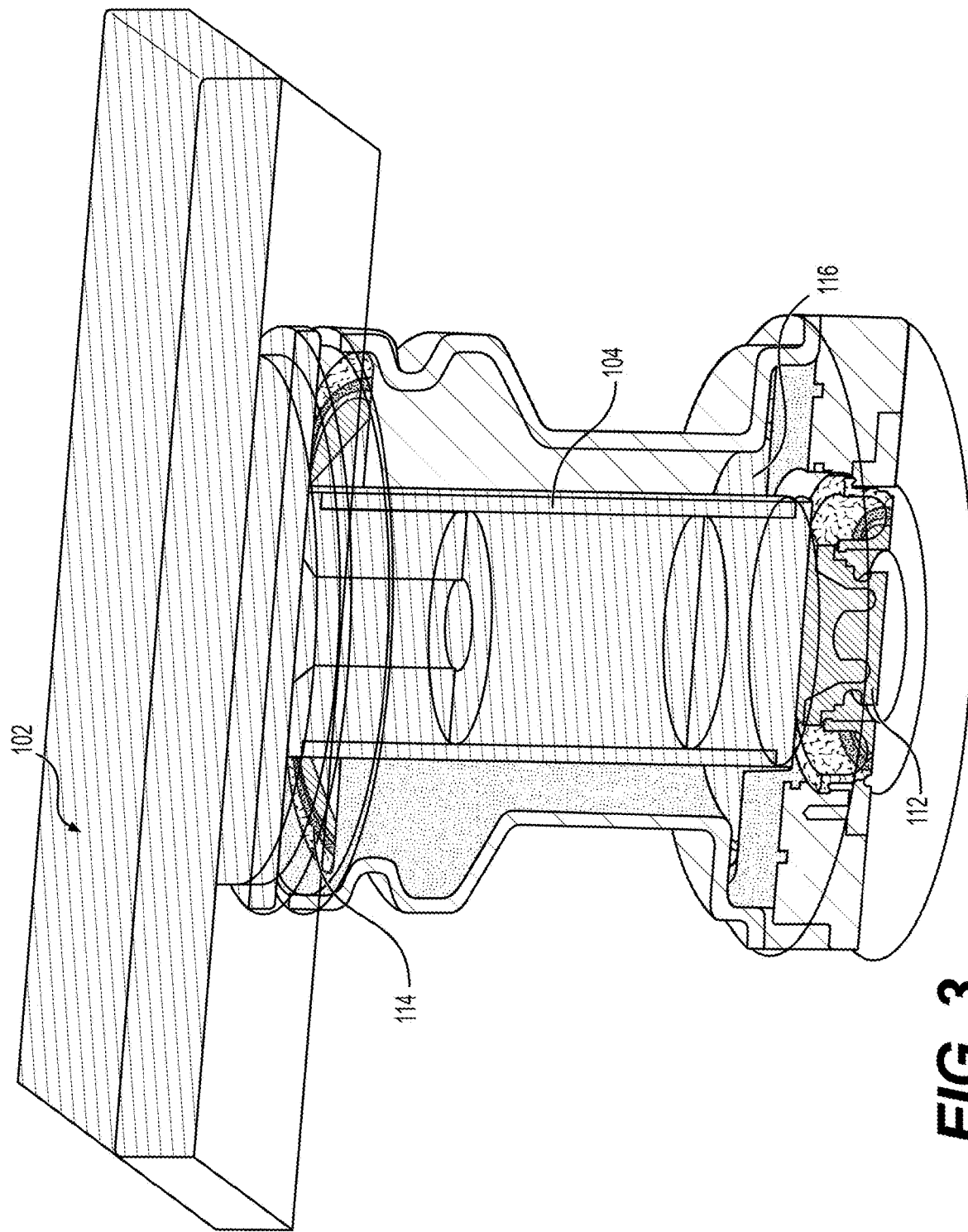
FIG. 3 is a displacement plot of the pedal assembly of FIG. 1A according to a load condition, in accordance with aspects of this disclosure.

FIG. 3 illustrates deformation of the system 100 resulting from the force applied at the first (central) location 202 in FIG. 2A. As shown in FIG. 3, the pedal 102 and the force transfer member 104 (shown by the gray-scale gradient) move the same order of magnitude as the location 102. For instance, the pedal 102 and/or the force transfer member, may move on the order of microns, e.g., up to about 20 microns in some instances. The two membranes 114, 116 are sufficiently thin so as to add minimal stiffness in the axial direction, e.g., so as to not dampen the applied force transferred through the force transfer member 104. The stiffness is coming out of the MSG sensing element. In this example, there is no deformation at the base 118 or the housing 120. An outer periphery of the membranes 114, 116 also exhibits little to no displacement. As shown, the displacement is substantially uniform along the axial direction, e.g., from the pedal 102 to the force sensor 112.

Figure 4:
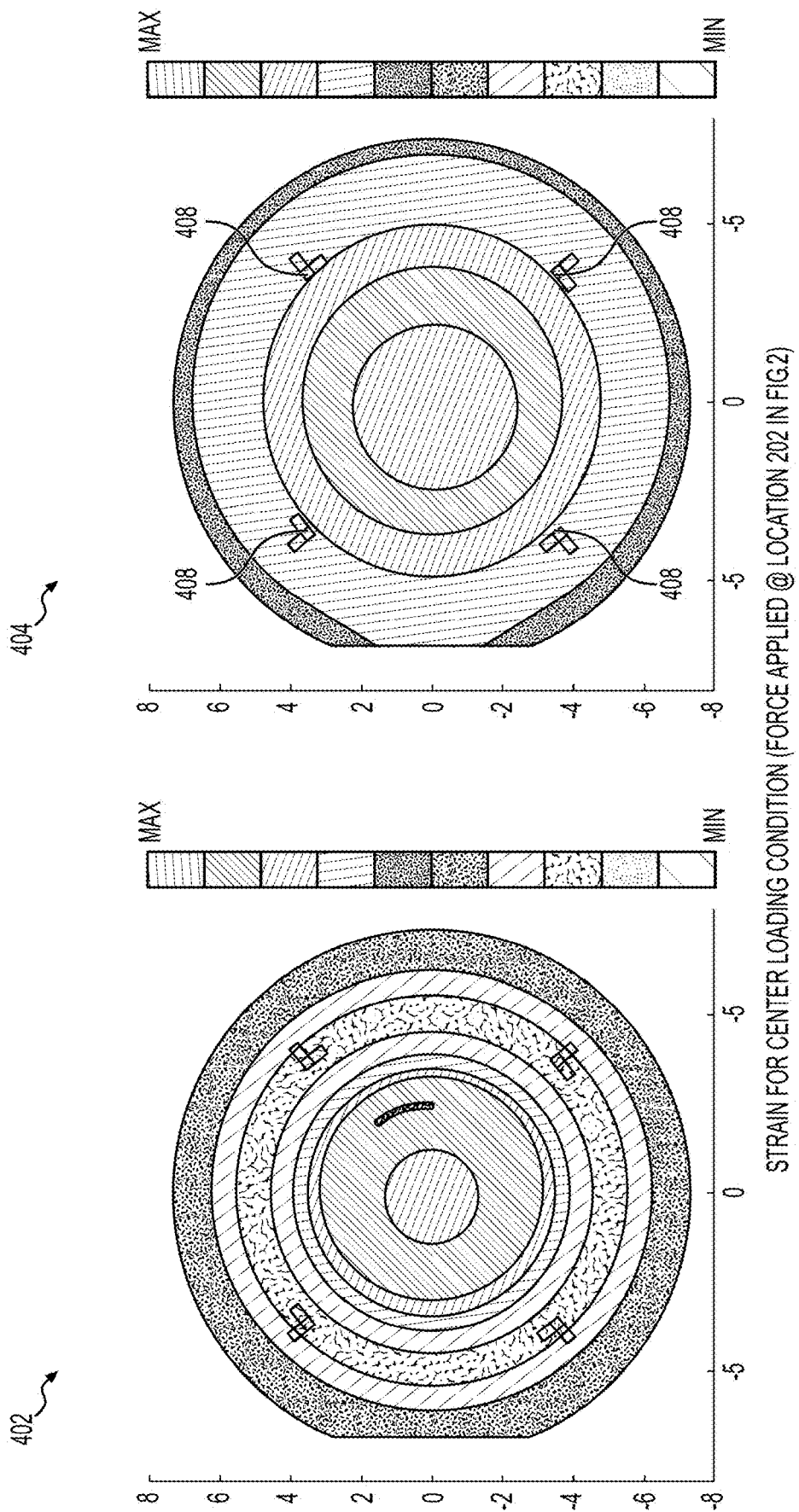
FIGS. 4 and 5 are strain plots of the pedal assembly of FIG. 1A according to different load conditions, in accordance with aspects of this disclosure.
Figure 4:
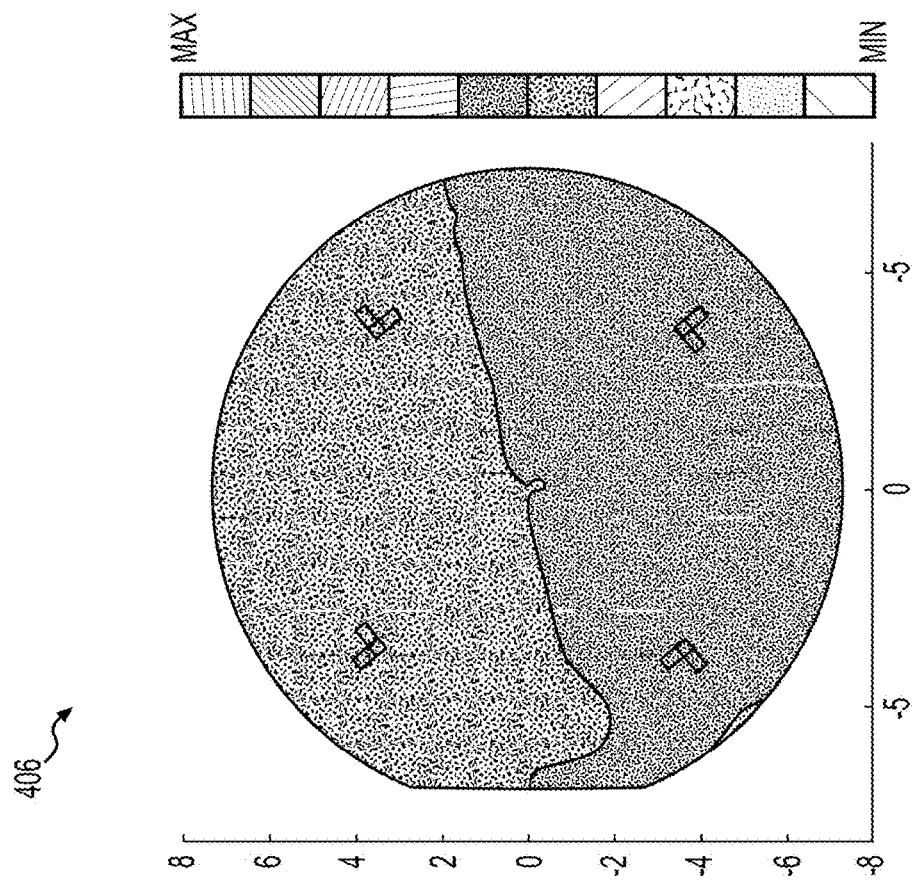

FIG. 4 illustrates strain for the loading at the first (central) location 202. More specifically, FIG. 4 includes a first representation 402 showing strain along the radial-direction in mm/mm, a second representation 404 showing strain along the tangential-direction, in mm/mm, and a third representation 406 showing strain in the r-t plane, all as measured at the force sensor 110, 112. FIG. 4 also shows the position of four strain gauges 408 associated with the force sensor 112. As shown in FIG. 4, the strain field is substantially axially-symmetrical, that is about a central axis (e.g., the axis 105), when the load is centered.

Figure 5:
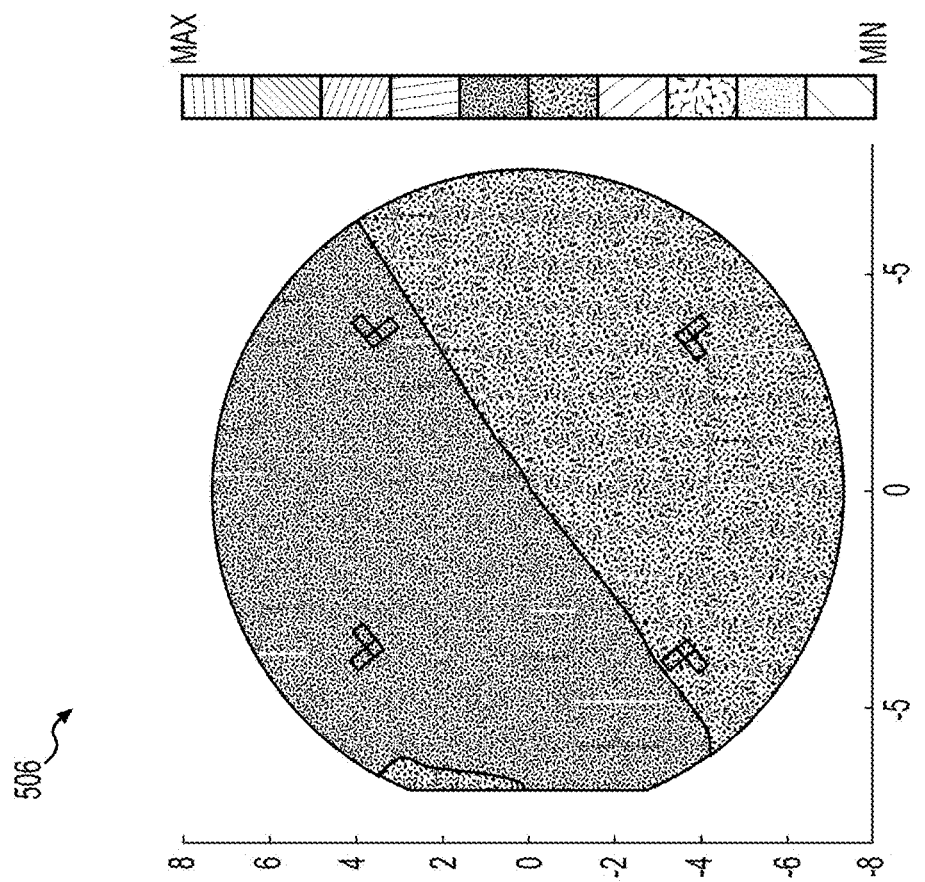

FIG. 5 illustrates strain for the loading at the second (off-center) location 204 of FIG. 2. More specifically, FIG. 5 includes a first representation 502 showing strain in the radial direction in mm/mm, a second representation 504 showing strain in the tangential direction, in mm/mm, and a third representation 506 showing strain in the r-t plane, all as measured at the force sensor 112. The four strain gauges 408 also are shown in FIG. 5. When the load is applied off-center, as shown in FIG. 5, there is a change in the strain field (as compared to FIG. 4), but the change is minor. In practice, when the four strain gauges 408 are used in the sensors, e.g., spaced equally about the axis 105, the full scale output of the sensor is affected by less than about 0.1% Fs. That is, the effect of the off-center load is largely negated by the membranes 114, 116 of this disclosure, especially when compared to other concepts. For example, and without limitation, FIG. 10, discussed below, shows an elastic-hinge design using a force sensor, and the shortcomings associated therewith.

Figure 6:
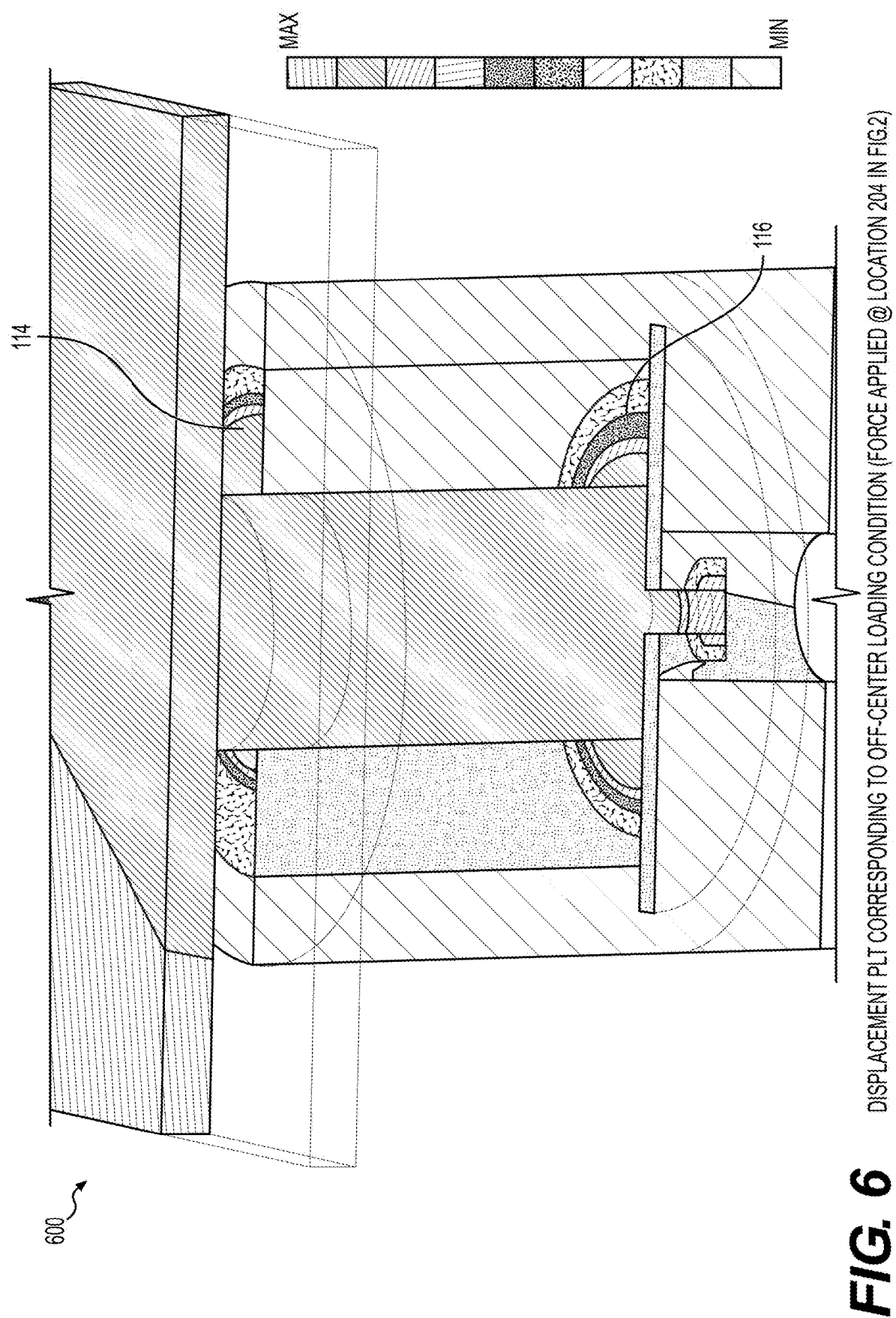
FIG. 6 is a displacement plot of the pedal assembly of FIG. 1A according to a load condition, in accordance with aspects of this disclosure.

FIG. 6 is a displacement plot 600 showing displacement under loading at the second location 204. That is, the displacement plot 600 shows displacements corresponding to the strains measured in FIG. 5. As will be appreciated, the off-center loading results in different displacements at the pedal, e.g., as a moment is created in the pedal 102 about the force transfer member 104. Sideloading also accompanies this off-center force application. As illustrated, the first, upper membrane 114 has a non-uniform displacement distribution, e.g., about the central axis 105, whereas the second, lower membrane 116 has a displacement that is relatively centered. As shown, the membranes 114, 116 reduce the effects of the sideloading at distances spaced from the pedal 102, such that the displacement is substantially consistent at the lower membrane 116 (and, therefore, at the force sensor 110, 112).

Figure 7:
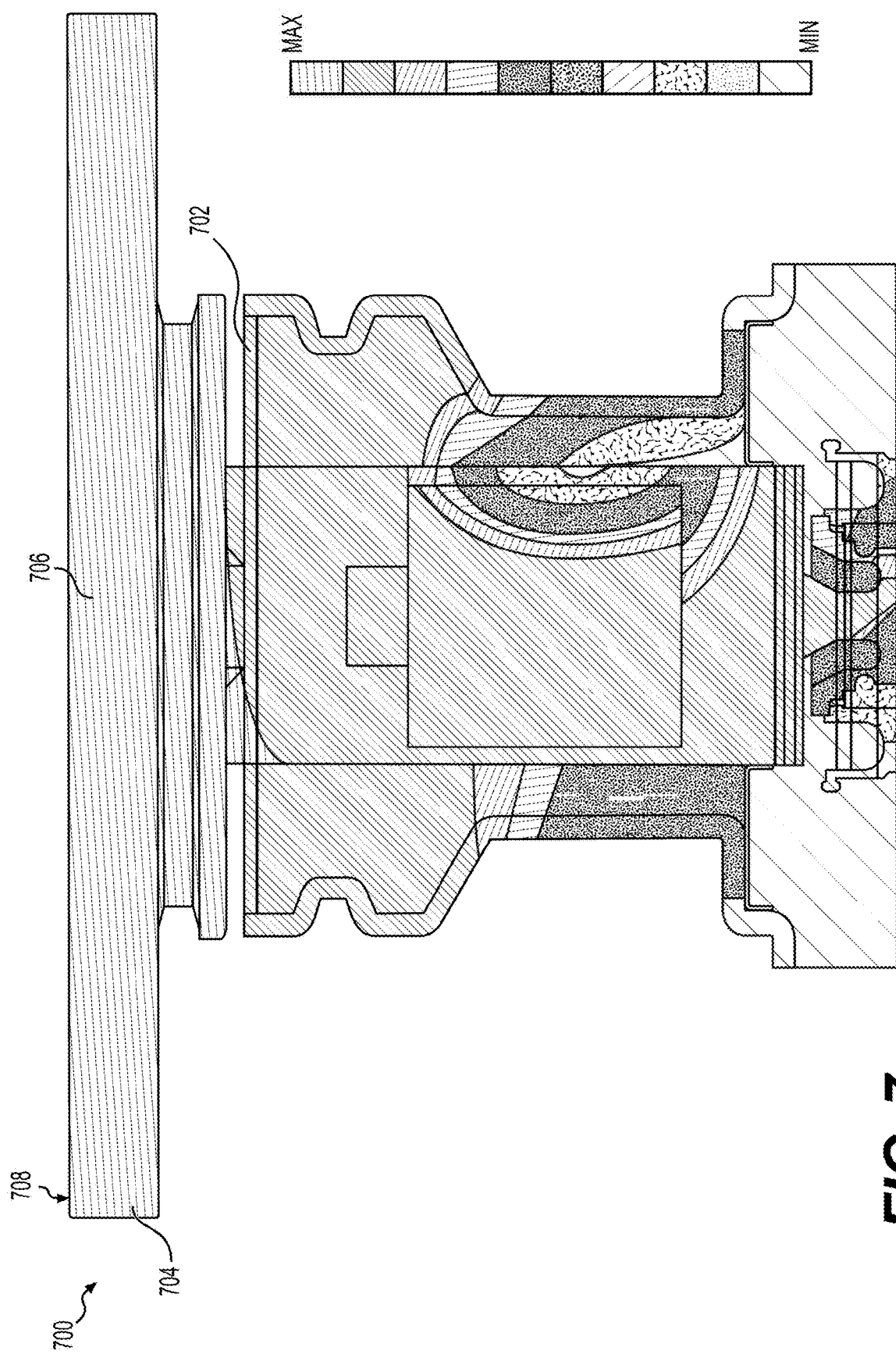
FIG. 7 is a displacement plot of an alternative pedal assembly, in accordance with aspects of this disclosure.

Although the example of FIG. 1 includes two membranes 114, 116, other implementations can include more or fewer membranes. For example, FIG. 7 shows a cross-section of an alternative brake pedal system 700. The cross-sectional view generally corresponds to the cross-section of FIG. 1B. Moreover, the system 700 is substantially the same as the system 100, except that it includes only a single membrane 702. The single membrane 702 generally corresponds to the first membrane 114 in size, shape, location, and/or the like.

Figure 8:
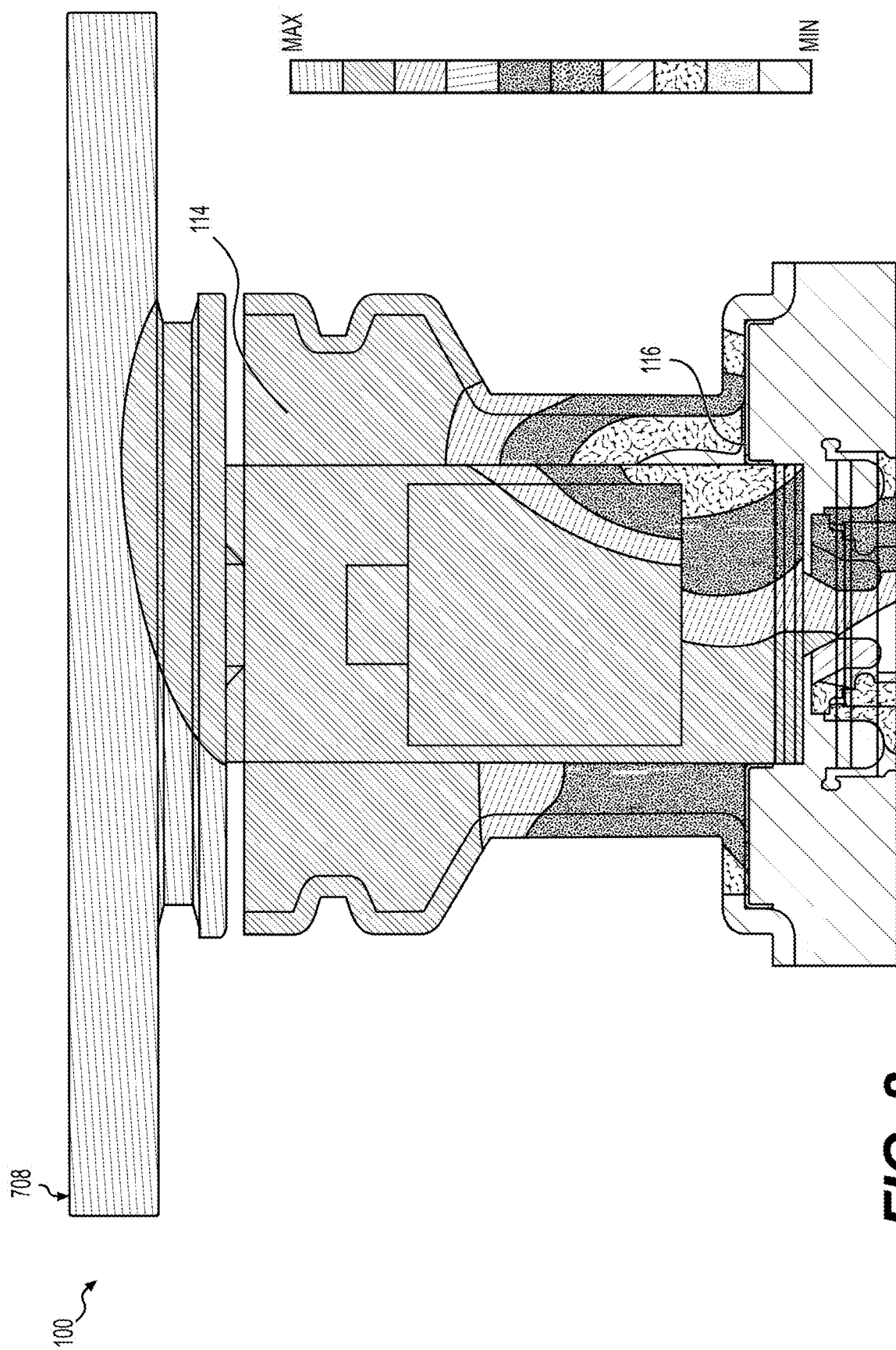
FIG. 8 is a displacement plot of the pedal assembly of FIG. 1A under additional load conditions, in accordance with aspects of this disclosure.

FIG. 7, like FIGS. 3 and 6, is a deformation plot, showing total deformation of the system 700 under loading. In this example, a 600 N force is applied off-center, proximate an edge 704 of the pedal 706 (e.g., at the arrow 708). For comparison, FIG. 8 shows total deformation of the system 100, e.g., with the two membranes 114, 116, under the same loading conditions, e.g., with the application of force along the arrow 708. As illustrated, the maximum displacement is lower when the two membranes are used (FIG. 8), by about 20%. Thus, the use of two membranes provides better resistance to deformation in an off-center loading than only a single membrane.

Figure 9A:
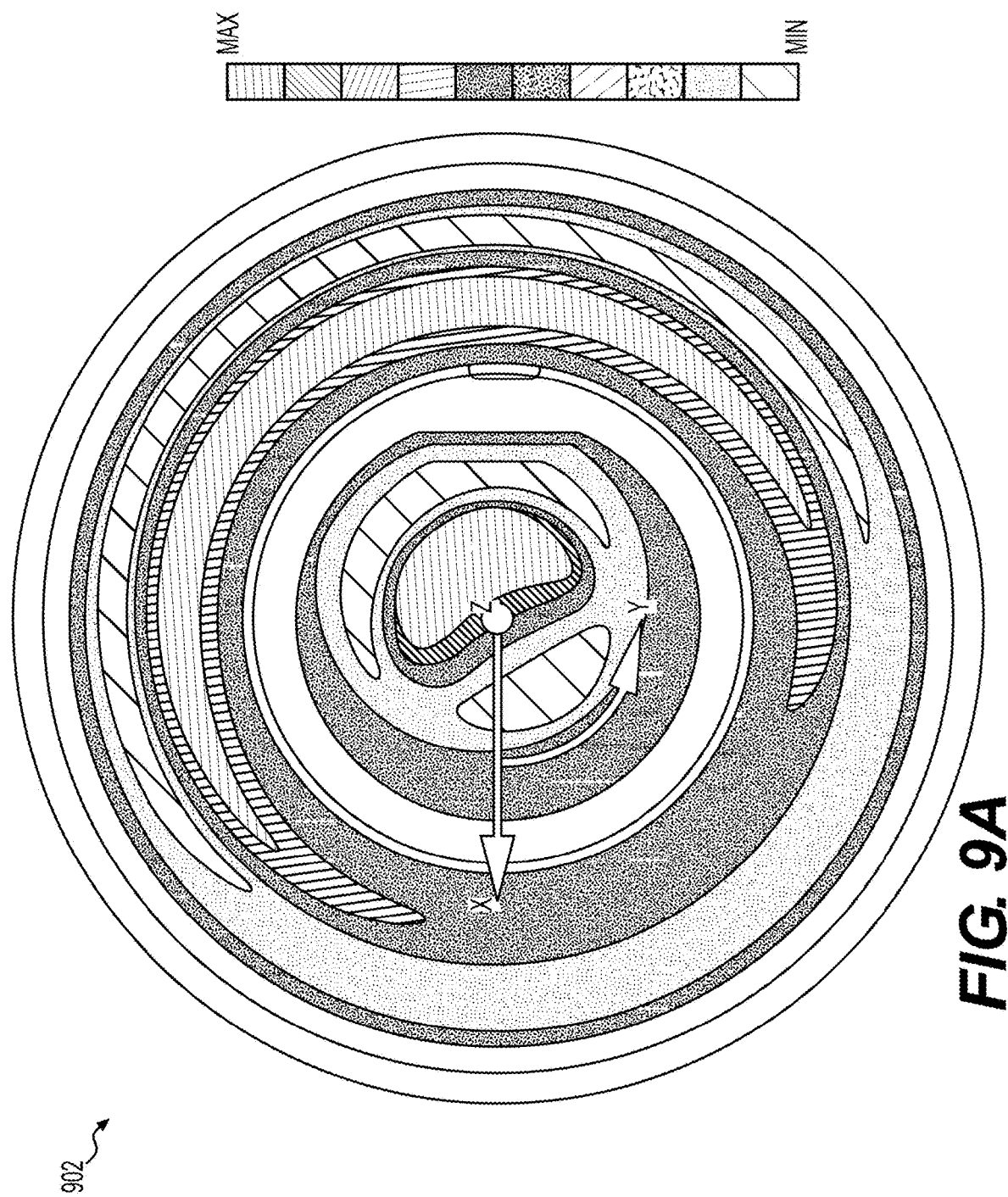
FIGS. 9A and 9B are strain plots of the loading conditions shown in FIGS. 7 and 8, in accordance with aspects of this disclosure.
Figure 9B:
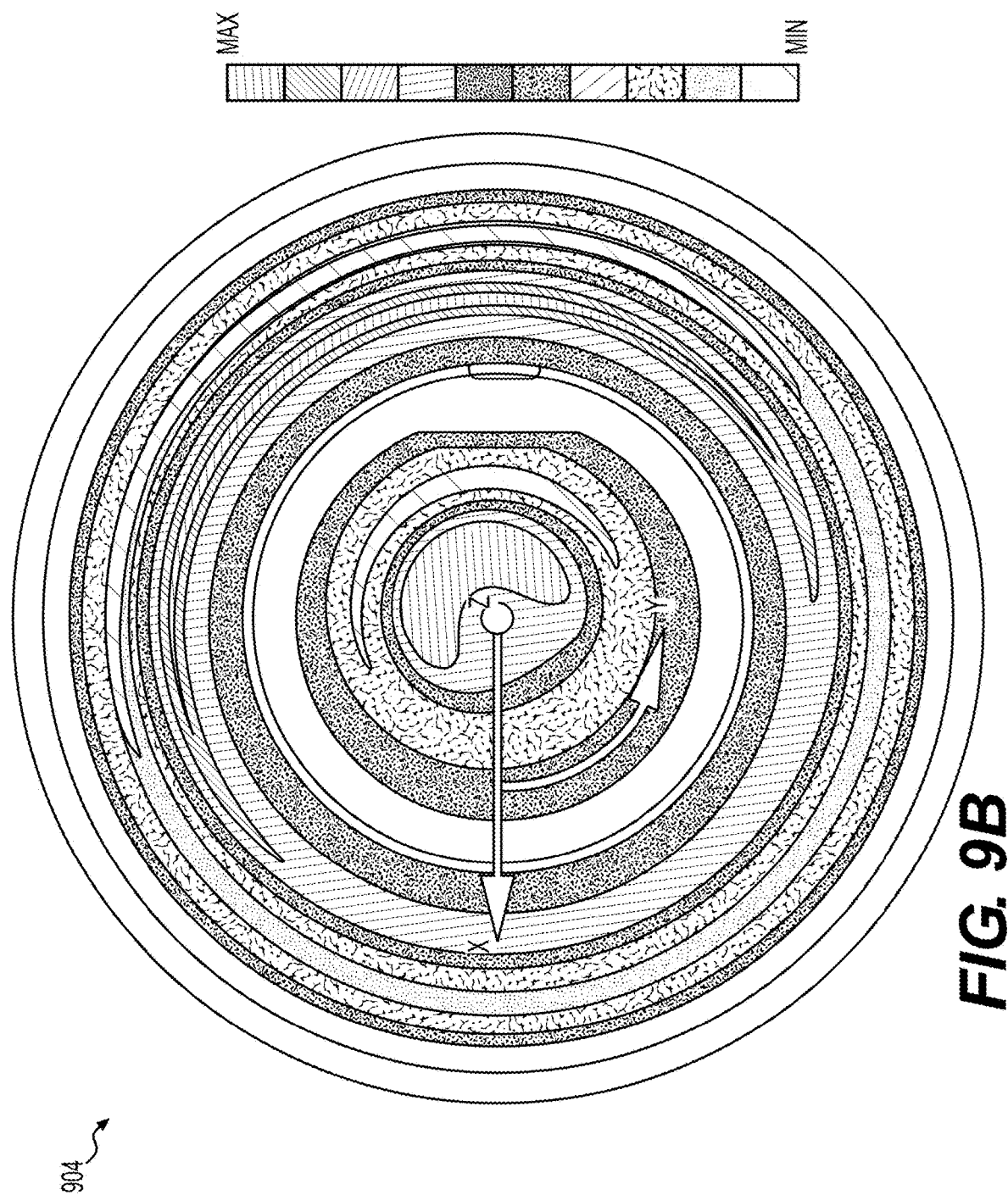

While FIGS. 7 and 8 show differences in deformation when the off-center force is applied, FIGS. 9A and 9B show radial strain for the two examples systems 100, 700, under the loading conditions of FIGS. 7 and 8. More specifically, FIG. 9A shows radial strain for the system 700 in which only the single membrane 702 is used, and FIG. 9B shows radial strain for the system 100 in which the two membranes 114, 116 are used. For avoidance of doubt, FIG. 9A shows a first graph 902 corresponding to the system and load condition of FIG. 7, and FIG. 9B shows a second graph 904 corresponding to the system and load condition of FIG. 8. As will be apparent from FIGS. 9A and 9B, the radial strain is more circular, e.g., symmetrical about a central axis, when two membranes are used (in FIG. 9B) as opposed to a single membrane (FIG. 9A). Moreover, when only a single membrane is used, the maximum strain on the sensing element membrane is larger by nearly a factor of 2. Thus, the two-membrane example of FIG. 1 may perform better than the single-membrane example in the instance of off-center loading. More specifically, the more circular/concentric shape of FIG. 9B may be more accurate and the lower strains may be beneficial to increase the robustness of the system against overloading. For instance, higher strains may result in glass cracking, as noted above.

Other modifications to the foregoing also are contemplated. For example, performance may be improved by adding additional membranes, e.g., one or more membranes disposed axially between the first membrane 114 and the second membrane 116. Also in alternatives, the rod 126 may be relatively more rigid and/or the housing 120 proximate the rod may be rigid (and provide additionally strain relief, like the membranes 114, 116).

Figure 11:
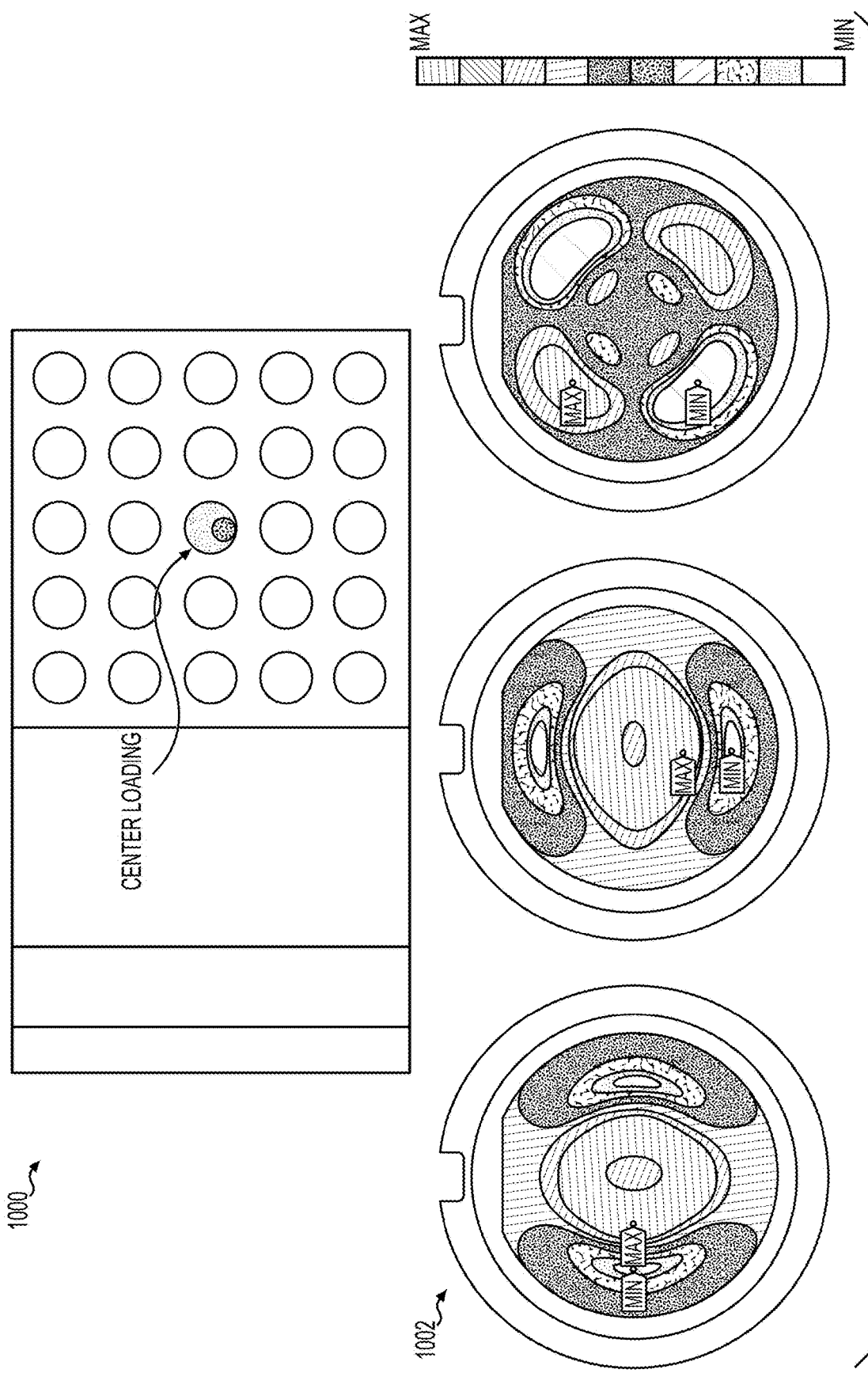
FIGS. 11 and 12 are strain plots associated with different loading conditions of the pedal design of FIG. 10, in accordance with aspects of this disclosure.
Figure 12:
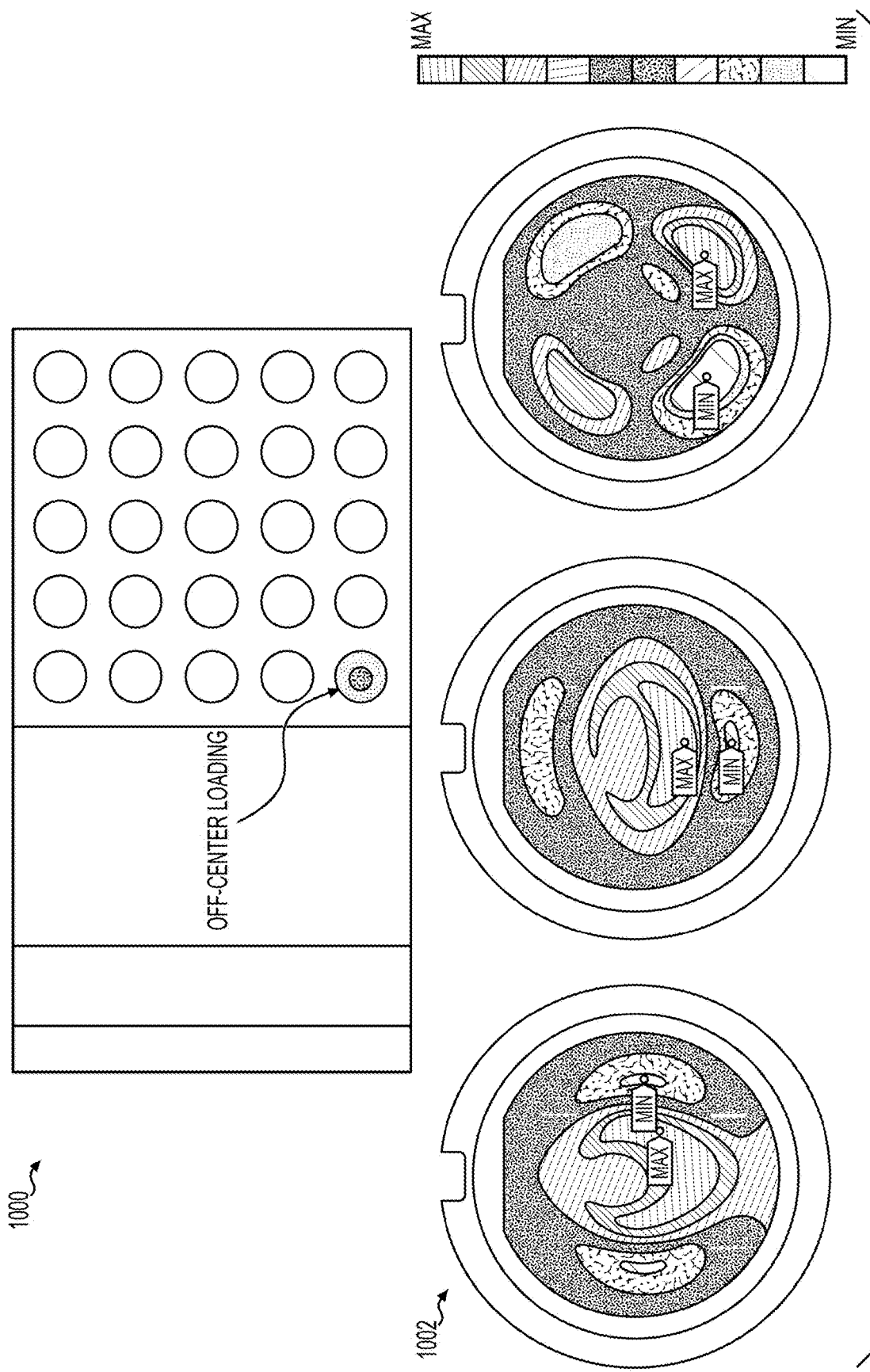

As noted above, the present disclosure may provide improvements over other systems employing force sensors. FIG. 10 demonstrates an elastic hinge concept 1000 with a force sensor 1002. FIG. 10 also shows two example loading conditions and resulting strain measurements associated therewith. More specifically, FIG. 11 shows an example of centered loading and FIG. 12 shows an example of off-center loading of the elastic hinge arrangement of FIG. 10. As will be appreciated, off-center loading of that design will have a large impact on the sensor output. The off-center loading shown in FIG. 12 has an impact of greater than 30% Fs. When the sensor output varies so widely, the vehicle cannot be controlled with certainty.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A pedal system comprising:
    a user interface configured to receive an application of force;
    a force sensor spaced from the user interface;
    a force transfer member extending, in an axial direction, between a first end coupled to the user interface and a second end coupled to the force sensor, the force transfer member configured to transfer a force applied at the user interface to the force sensor;
    a housing at least partially surrounding the force transfer member;
    a first annular membrane disposed within the housing and circumscribing the force transfer member proximate the first end of the force transfer member; and
    a second annular membrane disposed within the housing and circumscribing the force transfer member proximate the second end of the force transfer member.

2. The pedal system of claim 1, wherein the user interface comprises a substantially planar surface, the substantially planar surface extending, in a direction normal to the axial direction, beyond an outer surface of the force transfer member wherein the first annular membrane and the second annular membrane are configured to mitigate sideloading resulting from the application of force at positions proximate an outer edge of the substantially planar surface.

3. The pedal system of claim 1, wherein the user interface and the force transfer member are substantially rigid, such that the application of force causes negligible displacement of the user interface and the force transfer member.

4. The pedal system of claim 1, wherein the housing comprises:
    a sleeve extending from a first open end to a second open end and configured for placement over the force transfer member, the sleeve including a first membrane retention portion proximate the first open end and a second membrane retention portion proximate the second open end.

5. The pedal system of claim 4, wherein:
    the sleeve comprises a substantially cylindrical portion axially disposed between the first membrane retention portion and the second membrane retention portion; and
    at least one of the first membrane retention portion or the second membrane retention portion comprises a stepped portion including a flanged surface substantially normal to the axial direction of the sleeve.

6. The pedal system of claim 5, wherein:
    at least one of the first annular membrane or the second annular membrane has a substantially U-shaped cross-section including an annular surface extending between an inner edge angled relative to the annular surface and an outer edge angled relative to the annular surface; and
    the at least one of the first annular membrane or the second annular membrane is retained in the sleeve such that the annular surface contacts the flanged surface of the sleeve, the outer edge contacts the outer surface of the sleeve, and the inner edge contacts the force transfer member.

7. The pedal system of claim 1, wherein at least one of the first annular membrane or the second annular membrane has a thickness of between about 0.1 mm and about 0.5 mm.

8. The pedal system of claim 1, wherein the force transfer member comprises:
    an elongate, hollow rod extending between the first end of the force transfer member and the second end of the force transfer member; and
    an endcap coupled to the hollow rod proximate the second end and being configured to contact the force sensor.

9. The pedal system of claim 1, wherein the force sensor comprises a micro strain gauge sensor.

10. The pedal system of claim 1, wherein the force sensor comprises at least one of a ring force sensor or a pedal force sensor.

11. A system comprising:
    a user interface configured to receive an application of force;
    a micro strain gauge sensor spaced from the user interface;
    an elongate member coupled at a first end to the user interface and coupled at a second end to the micro strain gauge sensor and configured to transfer a force applied at the user interface to the micro strain gauge sensor;
    a housing at least partially surrounding the elongate member, the housing having an inner surface spaced radially from an outer surface of the elongate member; and a membrane circumscribing the elongate member and positioned between the inner surface of the housing and the outer surface of the elongate member.

12. The system of claim 11, wherein the membrane has a U-shaped cross-section, comprising an annular surface extending between a first edge, angled relative to the annular surface, and contacting the inner surface of the housing, and a second edge, angled relative to the annular surface and contacting the outer surface of the elongate member.

13. The system of claim 10, wherein the membrane is a first membrane arranged proximate the first end of the elongate member, the system further comprising:
a second membrane arranged proximate the second end of the elongate member.

14. The system of claim 13, wherein:
the first membrane comprises a first annular portion extending radially between a first inner edge angled relative to the first annular portion and a first outer edge angled relative to the first annular portion; and
the second membrane comprises a second annular portion extending radially between a second inner edge angled relative to the second annular portion and a second outer edge angled relative to the second annular portion.

15. The system of claim 14, wherein:
the first membrane is disposed such that the first inner edge contacts the outer surface of the elongate member and the first inner edge and the first outer edge extend toward the user interface; and
the second membrane is disposed such that the second inner edge contacts the outer surface of the elongate member and the second inner edge and the second outer edge extend from the second annular surface toward the micro strain gauge.

* * * * *